United States Patent Office.

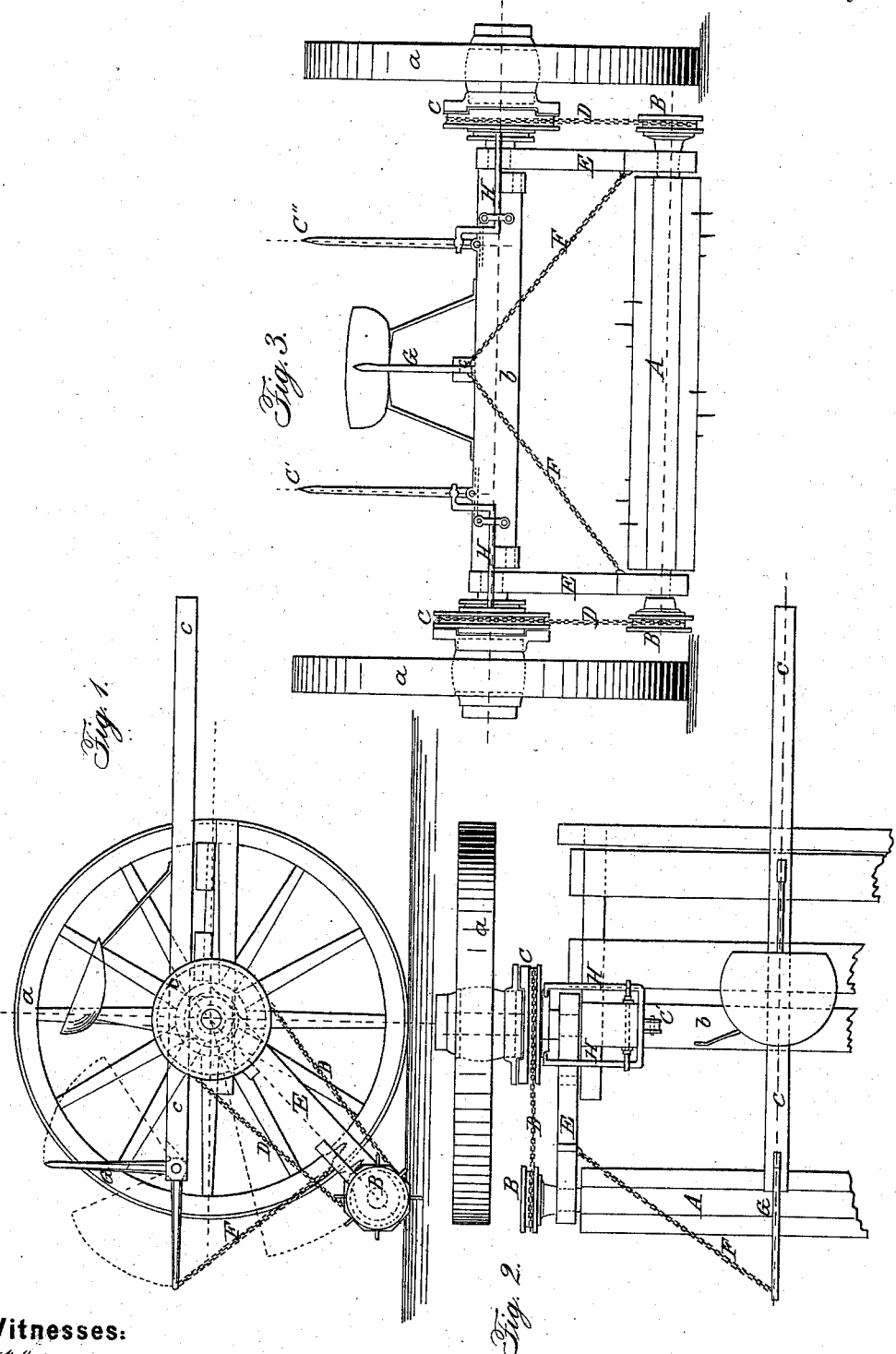

AMOS NEWELL, OF NEW YORK, N. Y.

Letters Patent No. 66,245, dated July 2, 1867.

IMPROVEMENT IN REVOLVING HARROW AND CULTIVATOR.

The Schedule referred to in these Letters Patent and making part of the same.

TO ALL WHOM IT MAY CONCERN:

Be it known that I, AMOS NEWELL, of the city, county, and State of New York, have invented a new and improved Revolving Harrow and Cultivator; and I do hereby declare that the following is a full and exact description thereof, reference being had to the accompanying drawings, and to the letters of reference marked thereon, making part of this specification.

The nature of my invention consists in rotating a spiked cylindrical or polygonal beam over the surface of the ground by means of proper geared wheels, actuated by the main or carrying wheels of the accompanying cart or wagon, or by means of a chain or chains passing over proper grooved pulleys of the desired diameter, which may be different diameters so as to give an increased motion of the spiked harrow, if desired.

To enable others skilled in the art to make and use my invention, I will proceed to describe its construction and operation.

On the axle of an ordinary two-wheeled cart, inside the proper position of the wheel-hubs, I fasten or secure two beams, E, which are firmly secured around the axle by means of a cap secured by proper bolts. At the lower end, having the same securing arrangements as the axle ends, I place a cylindrical or polygonal beam, having a gudgeon at each end, and furnished with blunt, strong iron spikes when the machine is used for harrowing, and with curved sharpened teeth for cultivating purposes. This harrow or cultivator is made to revolve by connecting it with the cart-wheels by a couple of iron chains, D D, in the following manner: Secured firmly, and forming a part of the inside band of each wheel-hub, is the fixed portion of the clutch C. The movable part of said clutch forms also the pulley, having a groove adapted for a chain band or belt. These pulley and clutches combined, C, are thrown in gear by means of a lever, which is represented in the drawings at H H when in gear, cause the pulleys to revolve with the wheels. Over these pulleys pass chain belts, one for each side of the cart, and which chains pass around a pair of pulleys, which are shown in the drawings at B B. These small pulleys B B form a fixed part of the revolving spiked harrow A.

When the cart is drawn over the ground with the two pulley clutches in gear, the spiked harrow revolves and pulverizes the earth. The speed of harrow A, as regards rotation, depends on the nature of work required, and depends on the relative diameters of the axle and harrow pulleys. Gears, also, may be used when desirable. When the harrow A is not required, for instance, when returning home, it can be hauled off the ground by means of the lever G and chain F, as shown in the drawings.

What I claim as my invention, and desire to secure by Letters Patent, is—

I claim the combination and arrangement of a spiked harrow, substantially in the manner and for the purposes described.

AMOS NEWELL.

Witnesses:
CHARLES H. GARDNER,
W. M. HABIRSHAE.